April 12, 1960

S. S. SPIEGEL ET AL 2,932,803

FREQUENCY MODULATOR

Filed Oct. 18, 1957

INVENTORS
STANLEY S. SPIEGEL &
LELAND E. THOMPSON
BY [signature]
ATTORNEY

United States Patent Office 2,932,803

Patented Apr. 12, 1960

2,932,803

FREQUENCY MODULATOR

Stanley S. Spiegel, Haddonfield, and Leland E. Thompson, Merchantville, N.J., assignors to Radio Corporation of America, a corporation of Delaware Application October 18, 1957, Serial No. 690,996

2 Claims. (Cl. 332—24)

This invention relates to a frequency modulator useful in a microwave relaying system utilizing frequency modulation for the transmission of intelligence.

An object of this invention is to provide an improved frequency modulator which gives a much larger frequency deviation than conventional modulators.

Another object is to provide a novel frequency modulator which has a highly linear response over a very wide frequency band, sufficiently wide to enable transmission of a color television signal or 600 multiplexed telephone channels, and which eliminates the need for automatic frequency control or limiter circuitry, thus rendering the arrangement extremely economical in design.

The objects of this invention are accomplished, briefly, in the following manner: An electron discharge device is connected to operate as a phase shift oscillator by means of a phase shift network connected between its output and input electrodes, the oscillatory frequency being that for which the network provides a phase shift of 180°. A pair of electron discharge devices are connected to inject currents into the respective opposite ends of said network, the signal excitation for these devices being obtained by connecting the input electrodes of both devices in parallel to the midpoint of the network. By supplying push-pull baseband or modulating signals to this last-mentioned pair of devices, the relative amplitudes of current injected by such devices are caused to vary, thereby varying the phase angle of the resultant or total current in the phase shift network and producing frequency modulation of the oscillator. The frequency modulated output may be taken from the midpoint of the phase shift network. Advantageously, two high transconductance, low capacitance triodes connected in parallel may be employed for the oscillator.

Figures 1, 4:
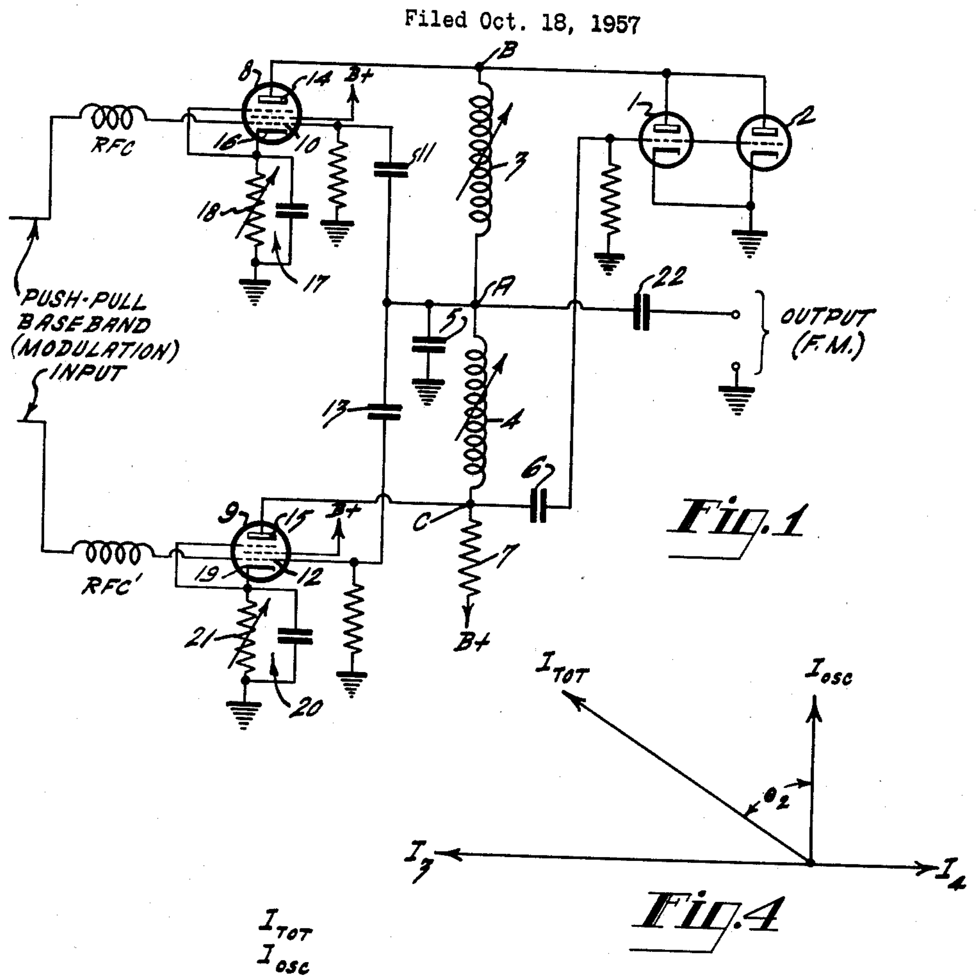

Referring now to Fig. 1, two high transconductance ($g_m$), low-interelectrode-capacitance electron discharge devices 1 and 2 have their electrodes connected in parallel and together are connected to function as a so-called phase shift oscillator which operates, for example, at a rest or undeviated frequency of 70 mc. The devices 1 and 2 are preferably high frequency triode vacuum tubes, and may each be a type 6AN4 tube, or they may be type 6AF4A tubes. In the phase shift oscillator of Fig. 1, the input and output of an amplifier are connected together by a feedback network which introduces 180° phase shift at the rest or undeviated frequency of the amplifier then functioning as an oscillator, there being a total loop phase shift of 360° (as necessary for oscillation) because of the 180° phase shift through the oscillator tube. Specifically, the phase shift network (which may be thought of as the oscillator tank circuit), is a two-section constant-K low pass filter in which a 90° phase shift is obtained across each section of the filter, and comprises two series-connected inductances 3 and 4, one for each filter section, the capacitances of the filter or phase shift network being constituted by the stray capacitances of the circuit, as well as by a small (on the order of 10 mmfd.) capacitor 5 connected from the junction point A of inductances 3 and 4 to ground. The end of inductance 3 (point B) remote from point A is connected directly to the anodes of tubes 1 and 2, while the corresponding end of inductance 4 (point C) is coupled by way of a capacitor 6 to the grids of these same two triodes. Thus, the two portions of the phase shift network provide a 180° phase shift in the oscillator anode-to-grid feedback path. In order to provide anode potential to the triodes 1 and 2, a resistor 7 is connected from the lower end of inductance 4 to the positive terminal B+ of a suitable source of unidirectional potential, the negative terminal of this source being grounded, like the cathodes of tubes 1 and 2.

With the connections described, and with the requisite gain in the oscillator tubes 1 and 2, the circuit oscillates at the frequency for which the phase shift in the network 3, 4, etc. is 180°, this being the rest or center frequency of the oscillator.

The use of two high-transconductance, low-internal-capacitance tubes connected in parallel as disclosed at 1 and 2 enables the gain times bandwidth constant to be increased. This is because, for two tubes in parallel the $g_m$ is doubled, yet at the same time the capacitance is not increased by the same ratio. Thus, this greater $g_m$ makes it possible to reduce the value of resistor 7 to less than 100 ohms, for example, and still maintain a strong oscillation; this reduction is desirable as it increases the bandwidth of the oscillator.

In order to modulate the frequency of the oscillator described, two pentode vacuum tubes 8 and 9 are utilized. These tubes may be of the 6AH6 type, for example. The control grids of these tubes are both coupled to the midpoint A of the phase shift network, grid 10 of tube 8 being coupled to this point through capacitor 11 and grid 12 of tube 9 being coupled to this point through capacitor 13. The anode 14 of tube 8 is connected directly to point B, and the anode 15 of tube 9 is connected directly to point C. Anode potential is thus applied to tubes 8 and 9 through resistor 7. The cathode 16 of tube 8 is connected to ground through a resistance-capacitance network 17 including an adjustable resistor 18, while the cathode 19 of tube 9 is connected to ground through a resistance-capacitance network 20 including an adjustable resistor 21. Push-pull modulation frequency signals, commonly termed baseband signals by workers familiar with the relaying art, are supplied through respective radio frequency chokes RFC and RFC′ to the control grids 10 and 12. That is, the modulation input to the two grids 10 and 12 is antiphasal or in push-pull. If modulation frequency signals in the video range, up to about 8 mc. for example, are utilized, the chokes RFC and RFC′ are designed to have a high impedance at the oscillator frequency of 70 mc., but a low impedance at 8 mc. Thus, the 70-mc. signal is effectively kept out of the modulation signal source, but the 8-mc. signals reach grids 10 and 12.

Frequency modulated output is taken off from the midpoint A of the phase shift network through a coupling capacitor 22, the output being taken against ground, as indicated in Fig. 1.

The grids of the two modulator tubes 8 and 9 are fed in parallel from the midpoint A of the phase shift network. In explaining the operation of the circuit of the invention, the vector diagrams will be with reference to point A, the output point of the circuit, and it will be assumed that $I_{osc}$, the plate current of the oscillator tubes 1 and 2, has a phase of 0° at point B. In going from point B to point A, $\bar{I}_{osc}$ is shifted 90° in phase by the action of the phase shift network, so in accordance with conventional vector notation, $I_{osc}$ has a 90° phase in Fig. 2. The voltage at the midpoint, A, is applied to the two modulator tube grids, this voltage being in phase with $I_{osc}$ in Fig. 2. The modulator tube plate currents resulting from the application of this voltage are also in phase with $I_{osc}$. Let us call these plate currents $I_8$ for tube 8 and $I_9$ for tube 9.

Figure 2:
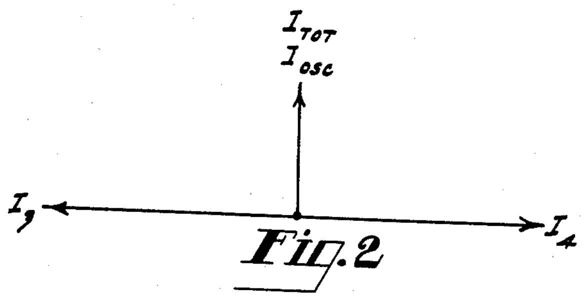

$I_8$ is injected into the oscillator phase shift network at point B and suffers a 90° phase shift in passing from point B to point A, giving a current represented by $I_3$ in Fig. 2. It can be stated that, since $I_3$ leads $I_{osc}$ by 90°, it has the same effect as a capacitive reactance. Another way of stating this is that $I_8$ has a 90° phase at point B while $I_{osc}$ has a phase of 0° (assumed) at this same point, so that the current injected by tube 8 leads by 90° and has the same effect as a capacitive reactance.

$I_9$ is injected into the oscillator phase shift network at point C and suffers a 90° phase shift in passing from point C to point A, giving a current represented by $I_4$ in Fig. 2. It can be stated that, since $I_4$ lags $I_{osc}$ by 90°, it has the same effect as an inductive reactance. Another way of stating this is that $I_9$ has a 90° phase at point C while $I_{osc}$ has a phase of 180° at this same point, due to the action of the phase shifting network 3, 4, etc.; thus, the current injected by tube 9 lags by 90° and has the same effect as an inductive reactance.

The total (output) current at point A is the vectorial summation of the various currents $I_3$, $I_4$ and $I_{osc}$.

The reactive currents $I_3$ and $I_4$ are porportional to the transconductance $g_m$'s of the modulator tubes. With no modulating (baseband) signal applied to grids 10 and 12, the $g_m$'s of tubes 8 and 9 are equal, giving equal and opposite reactive currents $I_3$ and $I_4$, so that the total current $I_{tot}$ is in phase with $I_{osc}$, as represented by Fig. 2.

If the $g_m$'s of the modulator tubes 8 and 9 are varied by a baseband signal applied in push-pull to the modulator grids 10 and 12, the amount of reactive current injected will vary at the baseband frequency rate, resulting in frequency modulation. This will now be explained in connection with Figs. 3 and 4.

Figure 3:
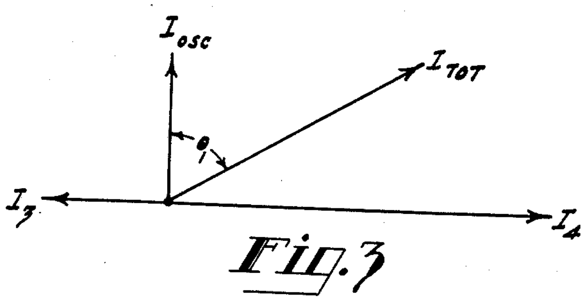

Fig. 3 represents the conditions obtaining at the peak of one half cycle of the baseband (modulating) signal. When a modulating signal is applied in push-pull to grids 10 and 12, during one half cycle of such signal $I_4$ will increase due to increased $g_m$ of tube 9 and $I_3$ will decrease due to decreased $g_m$ of tube 8. Then, the total (vectorial) current $I_{tot}$ will shift in phase from the undeviated or rest phase through an angle $\theta_1$. The phase shift network 3, 4, etc. can be considered to be a low pass filter operating beyond cut-off, whereby the phase angle at any particular point therealong (such as the midpoint A) varies with frequency. If the phase angle at point A changes an amount $\theta_1$, this corresponds to a change in the output frequency. In other words, the oscillator will oscillate at a new frequency corresponding to this phase shift $\theta_1$ Another way of considering the operation of the invention is as follows. If tube 8 injects in effect a capacitive current and tube 9 injects in effect an inductive current, these may be considered as capacitive and inductive reactances, respectively, connected with the oscillator phase shift network. If the capacitive reactance is decreased and the inductive reactance is increased, the total reactance of the phase shift network is varied, thus changing the amount of phase shift afforded by the network. This will cause the oscillator to operate at a different frequency, since it always oscillates only at a frequency at which the phase of the voltage at the oscillator grid is 180° out of phase with the voltage at the oscillator anode.

Fig. 4 represents the conditions obtaining at the peak of the second or other half cycle of the baseband (modulating) signal. On this second half cycle, $I_4$ will decrease due to decreased $g_m$ of tube 9 and $I_3$ will increase due to increased $g_m$ of tube 8. The total (vectorial) current $I_{tot}$ will shift in phase from the undeviated or rest phase through an angle $\theta_2$. The oscillator will now oscillate at a different frequency corresponding to this phase shift.

The oscillator frequency thus deviates back and forth at a rate corresponding to the baseband frequency, and with a peak deviation proportional to the amplitude of the baseband signal. Frequency modulated output is taken off from point A and fed to an external circuit.

The adjustable resistors 18 and 21 are provided so that the characteristics of the modulator tubes 8 and 9 can be matched exactly. The simultaneous adjustment of 18 and 21 will bring third order distortion to a minimum, while second order distortion can be controlled by adjusting the relative amounts of baseband voltage fed to the modulator grids 10 and 12.

No automatic frequency control or limiter circuitry is required. Any supply voltage changes will be effective in like senses on tubes 8 and 9, thus producing simultaneous changes in like senses of the inductance and capacitance and preventing any frequency changes of the oscillator from taking place due to this cause.

By employing two modulator tubes, over double the deviation of conventional circuits is obtained, with the same signal level. Corresponding improvements in linearity, frequency stability, incidental amplitude modulation, and group delay, are obtained.

In a modulator built according to this invention and successfully tested, the following are some of the results obtained. Center frequency, 70 mc; peak-to-peak deviation, 8 mc; second order distortion, −55 db; third order distortion, −54 db; center frequency shift, less than 100 kc. without AFC; incidental amplitude modulation, less than 2% without limiting; group delay at peak deviation, less than ±3 millimicroseconds (which means a very wide bandwidth); sensitivity, ±7 mc. per R.M.S. volt of signal.

What is claimed is:

1. An oscillator circuit comprising an electron control device having input and output electrodes, first and second inductances, means connecting one end of said first inductance directly to one end of said second inductance, means coupling the other end of said first inductance to said output electrode, means coupling the other end of said second inductance to said input electrode, whereby said inductances form a phase shift network effective to produce a phase shift of 180° in a wave of predetermined frequency passing therethrough, second and third electron control devices each having input and output electrodes, means coupling the output electrode of said second device to said other end of said first inductance, means coupling the output electrode of said third device to said other end of said second inductance, means coupling the input electrodes of said second and third devices to the junction of said first and second inductances, means to couple said other end of said second inductance to a source of positive unidirectional potential, means for applying push-pull modulating voltages to the input electrodes of said second and third devices, and means to derive an output signal from said junction.

2. An oscillator circuit as claimed in claim 1 and wherein said first device includes a further electrode connected to a point of reference potential, said second and third devices each including a further electrode connected to said point of reference potential through a separate resistance-capacitance network, and a capacitor connected between said junction and said point of reference potential.

References Cited in the file of this patent

UNITED STATES PATENTS

| | | |
|---|---|---|
| 1,629,685 | Ditcham | May 24, 1927 |
| 2,278,063 | De Lange | Mar. 31, 1942 |
| 2,342,708 | Usselman | Feb. 29, 1944 |